United States Patent Office 3,363,010
Patented Jan. 9, 1968

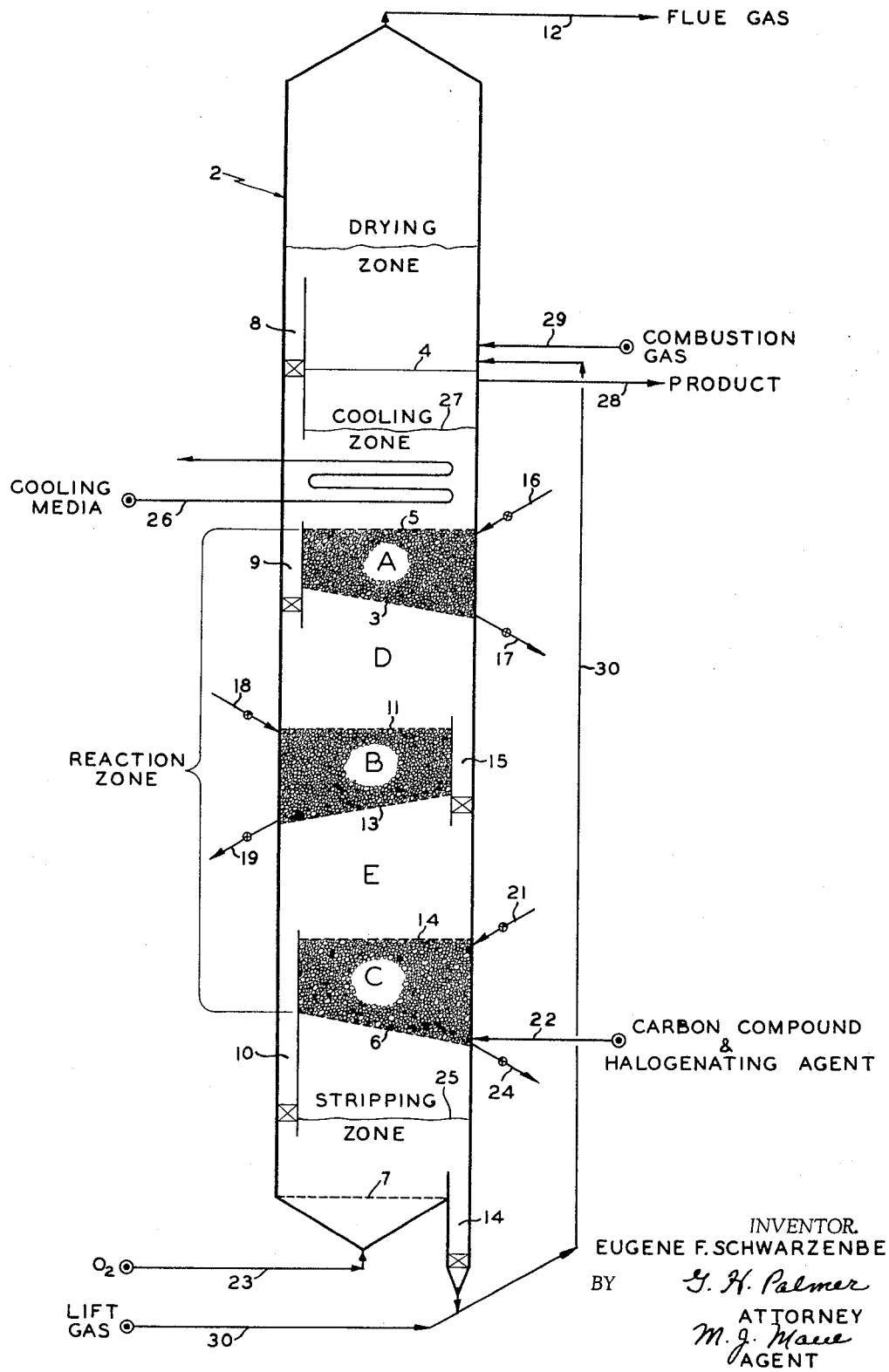

3,363,010
HALOGENATION PROCESS
Eugene F. Schwarzenbek, Short Hills, N.J., assignor to Pullman Incorporated, a corporation of Delaware
Filed Aug. 2, 1961, Ser. No. 128,860
16 Claims. (Cl. 260—648)

This invention relates to the halogenation of carbon compounds. In one aspect the invention relates to the halogenation of carbon compounds, hydrocarbons and halohydrocarbons with halogen in a system wherein water is produced as a by-product.

In recent years the demand for halohydrocarbons and perhalohydrocarbons has increased tremendously as new applications are found for members of this group. Well known applications for these chemicals have also experienced an expanding market. For example, ethyl chloride is used as antiseptic, as a refrigerant, and in the manufacture of tetraethyl lead. Vinyl chlorides are commonly used monomers in various polymerization processes while chloroform and carbon tetrachloride are valuable commercial solvents which find ever increasing application in newly developed processes.

It is well known that these or similar halogenated compounds can be produced by reacting a hydrocarbon or partially halogenated hydrocarbon with a hydrogen halide and oxygen in a thermal, catalytic, or photochemical process.

A very serious problem encountered in all of these processes involves the production of water and the solubility of the hydrogen halide in the water to form a highly corrosive reaction mixture. The presence of water in these systems also inhibits the halogenation reaction and greatly decreases the yield of halogenated compounds.

Thus, it is an object of the present invention to overcome these difficulties while providing a commercially feasible process.

Another object of this invention is to enhance the yield of halogenated products in a reaction involving a carbon compound, a halogen and oxygen.

Another object of this invention is to improve the overall efficiency in a process for the halogenation of hydrocarbons, halohydrocarbons and/or similar compounds.

A further object of this invention is to provide longer catalyst life in a process involving the catalytic halogenation of carbon compounds.

Still another object is to provide an improved process for the manufacture of dichloroethane.

These and other objects will become apparent to those skilled in the art from the accompanying description and disclosure.

Generally, the invention applies to halogen reactions wherein water is produced as a by-product of the reaction. These reactions are referred to hereinafter as condensation reactions. According to the present invention, the reaction involving a carbon compound, a halogen and oxygen is conducted in the presence of a desiccant which is present in the feed to the reaction zone in a weight ratio of between about 10:1 and about 200:1 based on oxygen. While the process is most preferably a catalytically effected, chlorination reaction, thermally or photochemically induced reactions of the above mixture, resulting in halogenation of the carbon compound, is also within the scope of this invention. It is also intended that this invention include within its scope, dehalogenation reactions wherein water is produced as a by-product of the reaction as, for example, the reaction between a highly halogenated hydrocarbon, such as tetrachloroethane, and a metal hydroxide, such as calcium hydroxide, to produce, for example, trichloroethylene, water and calcium chloride.

Of the hydrocarbon compounds or halogenatable compounds which can be employed in the present process, the aliphatic hydrocarbon compounds containing between 1 and 10 carbon atoms are most preferred. Compounds of this type include both saturates and unsaturates, examples of which are methane, ethane, propane, butane, octane, acetylene, methylacetylene, ethylene, propylene, butylene, decylene, butadiene, pentadiene, hexadiene, and alkyl and halogenated derivatives of this group of compounds such as chloromethane, dichloroethane, bromopropane, vinyl chloride, chlorobromoethane, dichlorobutadienes, etc. The aliphatic hydrocarbon reactant can also be a crude mixture containing hydrocarbons such as ethylene, formed by the destructive distillation of gas oil, or a mixture of olefins obtained from cracking kerosene and hydrocarbon oils. In addition to these most preferred halogenatable compounds, other hydrocarbon compounds can also be employed in admixture with the aliphatic compounds mentioned above or as the sole hydrocarbon compounds in the process. These compounds include aromatics, preferably those containing from 6 to 12 carbon atoms, such as benzene, toluene, xylene, naphthalene, diphenyl and halogenated derivatives thereof; naphthenes such as cyclobutane, cyclobutene, cyclohexane, cyclohexene, dimethylcyclopentene, methylethylcyclopentane, etc., and their halogenated derivatives and carbon compounds containing an element other than hydrogen and a halogen such as, for example, carbon monoxide, cresol, nitrobenzene, benzaldehyde, benzoic acid, aniline, pyridine, quinoline, thiophene and benzothiazole. It is to be understood that these last-mentioned non-aliphatic and substituted hydrocarbon compounds can be employed in an admixture and that the admixture can comprise the halogenatable compound mixture of the reaction or the admixture can be further mixed with an aliphatic hydrocarbon to comprise the halogenatable compound mixture of the reaction.

The halogen which is reacted with the carbon compound can be added to the carbonaceous material in the reactor or prior to entry into the reactor in the form of a hydrogen halide such as hydrogen bromide, hydrogen chloride, hydrogen fluoride and hydrogen iodide or as normally gaseous chlorine, bromine, fluorine, or iodine or a mixture of these halogen-containing reactants. In fact, when hydrogen fluoride is employed, it is advantageous to use catalytic amounts of chlorine or a chlorine-generating compound, preferably less than 10 percent of the theoretical amount required to chlorinate the carbon compound, in admixture with the hydrogen fluoride in order to initiate the reaction with the carbon compound and produce the corresponding fluorocarbon. When larger amounts of chlorine are used and the amount of hydrogen fluoride is correspondingly diminished, a chlorofluorocarbon is obtained.

If desired, compounds capable of generating chlorine in the process can be employed to partially or totally replace any of the halogen compounds recited above. Examples of compounds which generate reactive halogen include: cupric chloride, chromium chloride, ferric chloride, and the higher chlorides or other halides of metals having more than one transition state such as molybdenum, bismuth, antimony, etc. Other compounds included in the group of halogen-containing reactants include nitrosyl chloride, nitrosyl bromide, ammonium chloride, aluminum chloride and magnesium chloride.

Generally, the halogen-containing compound is present in the reaction mixture in a mole ratio of between about 0.05:1 and about 6:1 halogen to carbon compound, depending upon the reactivity of the halogen and the degree of halogenation required. In some instances, it is desirable to partially halogenate the carbon compound, particularly in the case of low molecular weight olefinic hydrocarbons before contacting with the oxidizing agent. The extent of prior halogenation, however, should not be above 50 percent of the halogenation desired.

The oxygen reactant in the process of this reaction is added in the form of elemental oxygen, air, ozone, or oxygen-yielding compounds such as oxides of nitrogen, nitric acid and metal oxides, such as cupric oxide, ferric oxide and molybdenum trioxide, although elemental oxygen and air are the preferred reactants. The mole ratio of oxidizing reactant to halide is between about 3:1 and about 1:10, preferably between about 1:1 and about 1:5.

Although the process can be carried out photochemically at low temperatures, or thermally at high temperatures, the halogenation is preferably effected with the aid of a catalyst. Suitable catalysts in this reaction include the metal halides such as, for example the halides (preferably bromides and chlorides) of aluminum, bismuth, antimony, zinc, lithium, magnesium, calcium, copper, tin, iron, silicon, thorium, mercury, barium, cesium, and metal oxides such as the oxides of chromium, potassium, thorium, cesium, manganese, uranium, copper, iron, aluminum, calcium, silicon or any of the catalysts commonly used in a Deacon halogenation process. When bromination is the desired reaction, the bromide of the metal is preferably employed as the catalyst; when chlorination is the desired reaction, the chloride of the metal is generally employed as the catalyst; but when fluorination is the desired reaction, the chloride of the metal is beneficial to promoting the fluorination reaction by inducing a series of substitution reactions. It is to be understood that mixtures of the above catalytic compounds such as mixtures found in zeolite, glauconite and beauxite, may be employed if so desired. It should also be pointed out that metals in the form of oxychlorides may serve as catalysts in the present process. An example of this type of catalyst is cuprous oxychloride. Of the above catalytic agents cupric chloride, copper silicate, ferric-ferrous oxide, and chromium sesquioxide are preferred as the catalytic material. However, in selecting a catalyst, consideration must be given to the conditions of the reaction in relation to the vapor pressure, stripping rates and activity of the catalyst.

The catalyst is optionally, but preferably, deposited on a suitable carrier material, such as silica, alumina, pumice, or any other convenient carrier. When a fluid bed system is used, it is important that the carrier be of a sufficient hardness to possess substantial resistance to attrition. If desired, the catalytic materials may be promoted with polyvalent metals such as copper, antimony, mercury, bismuth, etc., or with lithium or silicon, although unpromoted catalysts are generally employed. When a catalyst is used, in a moving bed operation, it is present in the reaction mixture in an amount between about 25 percent and about 75 percent of the catalyst-desiccant mixture.

According to this invention, a desiccant material is added to the above reaction mixture in the reaction zone in a weight ratio of between about 10:1 and about 200:1 based on oxygen in the system or on the potential amount of water which the system can produce. The advantages in having the desiccant present in the reaction zone are that water, generated by the process is instantly absorbed in the desiccant material thus leaving the halogen to react with the carbon compound in a concentrated condition while avoiding the formation of an aqueous hydrogen halide corrosive mixture. Since the desiccant removes the water as rapidly as it is formed, the reaction proceeds at an accelerated rate and the problem of separating product from the reaction mixture and purifying it is much simplified. The disadvantage of providing special reactors which will withstand the corrosion caused by aqueous hydrogen halide is thus avoided and, as a result of avoiding dilution, the carbon compound is more intimately contacted with the halogen moiety while by-products sometimes formed in the presence of water, such as the formation of a ketone or aldehyde when acetylenes are present, is completely avoided. The desiccant can be removed with the catalyst for regeneration or the desiccant material can be separately withdrawn and regenerated by drying before it is returned to the system, if desired.

The desiccant material employed according to the teaching of this invention, is a material which selectively absorbs the water produced in the reaction as it is formed. Although the desiccant in the present process can be alumina, silica, mica, talc, or calcium chloride, dried to a water content of less than 10 percent, the preferred desiccant is a clay having at least 1 percent reversible water content and a crystalline structure at temperatures up to 1400° F. or higher. Such clays are the bentonites including montmorilloniiet, beidellite, nontronite, hectorite, saponite, and sauconite. To increase the porosity and enhance the absorption properties of the absorbent, it is advantageous to partially activate the desiccant material thus, acid activated desiccants are preferably employed. These materials are produced by leaching or boiling the clay with an acid such as hydrochloric acid or sulfuric acid.

The desiccant material is present in the reaction mixture in an amount of at least 1 part by weight and up to about 20 parts by weight or higher based on the metal of the catalyst, although the preferred range is between about 2 parts by weight and about 10 parts by weight of desiccant. An additional amount of bentonite, over and above that required to desiccate the reaction can be employed as the catalyst carrier, when it is desirable to employ a carrier. When the reaction is thermally or photochemically induced and the addition of a catalyst is omitted, the desiccant is present in the reaction feed mixture in an amount of at least 10 parts by weight of the oxygen present.

Generally in all reactions, the weight ratio of the desiccant to water formed in the system is between about 10:1 and about 200:1, preferably between about 25:1 and about 100:1 or a stoichiometric ratio with the water produced by the reaction.

The reaction is carried out preferably with at least the solid desiccant, in a fluid or moving bed, most preferably in a fluid bed with countercurrent introduction of the gaseous and/or liquid materials comprising the oxidizing agent, the carbon compound, and the halogen-containing compound. Generally, a fluid solid system is preferred since this mode of operation provides better contact, avoids the occurrence of "hot spots" in the reaction zone and facilitates the continuous removal of spent desiccant containing water from the reaction zone for regeneration and for subsequent recycle, if desired.

While the above halogenation reaction is being carried out, the desiccant absorbs the water produced by the reaction until the desiccant approaches its saturation limit. When or before the saturation limit is reached, either the reaction is discontinued or the desiccant material is withdrawn and subjected to regeneration at a temperature between about 500° F. and about 1400° F., under from about atmospheric pressure to 150 p.s.i.g., preferably with the bentonite desiccants, at between about 1000° F. and about 1200° F. under about atmospheric pressure. The desiccant is heated at the desired temperature for a period of from about 1 minute to about 30 minutes, although a longer heating period may be employed if desired, providing the loss of crystallinity in the desiccant material is avoided. After regeneration, the desiccant can be cooled to below or about the temperature at which the halogenation reaction is effected so that it can be recycled to the reaction zone. In instances where the halogenation is conducted at a higher temperature, the regenerated desiccant can be recycled directly. This procedure may be repeated as often as necessary and at as frequent intervals as the particular desiccant may require.

The bentonites are most preferred as desiccants in the present process because they are unique in their ability to maintain a lattice structure at temperatures as high as 1400° F. Another unique characteristic of these preferred clays is their ability to absorb up to 4 percent by weight of water and their suitability for repeated high temperature regeneration without loss of crystallinity or absorption capacity. The absorption of water by these clays is not merely a surface absorption or physisorption, but chemisorption on particular sites of the layer-like crystalline lattice; thus, water is effectively and permanently removed from the reacting materials in the reaction zone.

The solids, e.g., both desiccant and catalyst, may be disposed as fixed beds in a plurality of reaction zones with gaseous material being introduced alternatively to each of said zones and simultaneous regeneration of the solid material in a zone wherein introduction of reactants has been discontinued. By this mode of operation, the halogenation of the carbon compound is carried out in one zone until it becomes necessary to regenerate the desiccant containing the water formed in the process; whereupon the reaction is discontinued and the reactants passed to a second zone containing previously regenerated desiccant and catalyst, while the spent desiccant is regenerated in the first zone by heating to drive off water. Alternatively, the reaction may be continued in the first zone and the desiccant removed therefrom for regeneration in a separate heating zone. Another modification of the reaction process comprises passing the reactant mixture through a series of reaction vessels containing catalyst and desiccant; subsequently and progressively by-passing one of the reaction zones in the series for regeneration when needed.

In the fluid system either or both of the solids can be fluidized. One embodiment of this method, involves employing a catalyst and a desiccant of different particle size, the desiccant particles, for convenience in fluidization separation, being the smaller, for example less than about 200 mesh as compared with a catalyst size of between about ¼ inch and about 1 inch, so that the desiccant and catalyst may be separately withdrawn from the reactor at the same or different time intervals for regeneration in the same or separate regeneration zones. In this embodiment, it is desirable to remove the powdered desiccant continuously and to regenerate it in a separate zone. Illustrative of this method, is the process wherein the fluid desiccant flows through the fixed catalyst bed into a stripping zone and then into a heating zone for water removal. The velocity of desiccant through the reaction zone is such that it does not exceed the incipient fluidization velocity of the catalyst particles so as not to entrain catalyst in the settling zone, e.g., 0.25 to 1 ft./sec. In this modification, it is desirable to employ the larger catalyst particles in a fixed or moving bed while powdered desiccant is maintained in a fluid state throughout the entire reaction zone, preferably in countercurrent flow to the reactants of the process.

The desiccant with or without catalyst is preferably regenerated after absorbing about 1 percent by weight of water; although, the reaction may be safely conducted with the preferred bentonite desiccant up to about 2 percent water absorption or the saturation limit of the clay. If necessary, the desiccant can be stripped before regeneration at high temperatures. The embodiment wherein the catalyst is not removed with the desiccant, is advantageous in that the catalyst is not subjected to the temperatures of regeneration which under severe conditions may degrade certain catalysts otherwise suitable for the halogenation reaction.

Generally, the catalytic halogenation reaction involving a carbon compound, halogen and oxygen is conducted at a temperature between about room temperature and 1200° F. under a pressure of from about 0 p.s.i.g. to about 200 p.s.i.g.; preferably at a temperature of from 490° F. to about 925° F. and a contact time of from about 5 seconds to about 10 minutes. The photochemical reaction is generally conducted at a temperature between about 0° F. and about 500° F., preferably 30° F. to about 150° F. and desirably under an elevated pressure, although atmospheric pressure can be employed and pressures as high as 500 p.s.i.g. and higher are practical, a preferable range is from 50 p.s.i.g. to 250 p.s.i.g. The thermal halogenation reaction is carried out at temperatures between about 500° F. and 950° F., preferably from about 650° F. to about 800° F. under atmospheric or elevated pressure.

Although in the present invention the space velocity or contact time can vary within a wide range, for example, between about 25 cc. and about 700 cc. of halide per hour per gram of catalyst, preferably between about 100 cc. and about 400 cc. of halide per hour per gram of catalyst, depending upon the reactants and the temperatures and pressures employed, a convenient space velocity of from about 0.1 gram to about 4 grams of vaporous or liquid feed per hour per gram of solids is recommended as most desirable.

Reference is now had to the accompanying drawing which serves to illustrate a particular and preferred embodiment of this invention, but is not to be construed as unnecessarily limiting to the scope of this invention.

According to the drawing, a vertical contacting vessel 2, containing four separate zones situated one above the other and separated from each other by plate 4 and grids 5 and 6, is arranged for continuous operation. The zones, from the top of the vessel to the bottom comprise a drying zone, a cooling zone, a reaction zone and a stripping zone as labeled in the drawing. The reaction zone is subdivided into three separate and stationary catalyst beds (a), (b) and (c) and two alternate fluid desiccant chambers (d) and (e), said beds and chambers being separated by grids 3, 11, 13 and 14. Communicating passageways or standpipes 8 through 10 and 15 are vertically disposed to connect adjacent zones and for downward passage of fluidized desiccant therethrough. Vapor vent line 12, located at the top of the contacting vessel is provided for removing steam and inert gases which accumulate in the system as a hyproduct and from impure feed materials. A valved outlet standpipe 14 located in the bottom of the vessel is provided for downwardly removing fluidized desiccant from the stripping zone while inlet line 23 provides for introducing stripping gas into the bottom of the vessel, below grid 7 of the stripping zone. Valved catalyst inlet lines 16, 18 and 21 are employed to replace catalyst drawn off for regeneration and reactivation through lines 17, 19 and 24. The catalyst may be withdrawn continuously or at desirable intervals in a controlled amount, while reactant materials such as the carbon compound and the halogen-containing reactant are introduced into the reaction zone through feed line 22. In the reaction zone, the reactants from line 22 pass upwardly through grid 6 and catalyst bed (c) into fluidized desiccant chamber (e), continue their upward passage through grid 13 and catalyst bed (b) into fluidized desiccant chamber (d) and thus pass through grid 3 into catalyst bed (a). The desiccant chambers between the catalyst beds provide better heat control to the exothermic reaction since they act as a quench between the catalyst beds. The desiccant is maintained at a lower temperature than the gaseous reactants by its downward passage from the cooling zone by-passing the catalyst beds. The gaseous materials leaving the reaction zone pass upwardly through grid 5 and are cooled by direct contact with solid desiccant in the cooling zone and by indirect heat exchange with coil 26, wherein cooling water is circulated. The cooling zone also serves to further dehydrate the gaseous material by contact with fresh desiccant and by condensing water present in the vapors. In addition to this function the cooling zone is employed to regulate the temperature in the reaction zone through which the exothermic halogenation gas mixture passes.

The halogenated product is removed from the vessel by means of line 28 while the cooled desiccant, containing water condensed in the cooling zone is transferred through standpipe 9 into quench zone (d) to cool and to extract additional quantities of water from the effluent leaving catalyst bed (b). The desiccant from zone (d) is then passed downwardly to zone (e) to cool and to extract an additional amount of water from the effluent leaving catalyst bed (c). It is desirable in most operations of this employing fluidized desiccant, to provide cyclone separators near the top of the cooling zone to minimize desiccant entrainment and loss in the product effluent. The fluidized desiccant in the quench zone (e) which is ready for regeneration, is continuously withdrawn through valved standpipe 10 and passed downwardly in a confined column to the fluidized bed of desiccant in the stripping zone. In the stripping zone the desiccant is contacted with upwardly flowing oxygen-containing gas to strip out any chlorine gas which may be entrained with the desiccant and to maintain the desiccant in a fluidized state at bed level 25. The resulting gas mixture is passed upwardly into the reaction zone through grid 6 together with the organic halogenatable compound and halogenating agent. The stripped desiccant is withdrawn downwardly from the stripping zone through valved standpipe 14 from which it is passed into line 30 wherein it is admixed with an inert lift gas which passes upwardly in line 30 for fluidization of the desiccant and for transferring the desiccant to the lower portion of the drying zone at the top of the vessel. In the drying zone a sufficiently elevated temperature is maintained to drive off substantially all of the water absorbed by the desiccant and to restore the desiccant to its original crystalline form. In this embodiment, gaseous combustion with gas from line 29 is used to generate the heat required. For best results, a fluidized bed is also maintained in the drying zone. The steam and inert gases are withdrawn from the vessel by line 12 while the regenerated desiccant is downwardly withdrawn from the drying zone by means of valved standpipe 8 from which it is returned to the cooling zone at a point below the fluid bed level 27, maintained therein for downward recirculation through the vessel.

The above description provides a general procedure for operating the apparatus shown. It is to be understood that any of the carbon compounds and halogenating compounds described above can be used in the embodiment of this process. It is also to be understood that the fixed catalyst beds shown in the drawing can be replaced by finely divided catalyst which is circulated along with the desiccant material in the vessel. In this case, grid 6 could be horizontally disposed as the need for separate draw-off of catalyst would be eliminated.

*Example*

A mixture of ethane and hydrogen chloride in a mole ratio of about 1:1 is introduced through line 22 into the lower portion of a stationary catalyst bed (c) of cupric chloride having a particle size of about ¾ inch. An excess over the stoichiometric amount of oxygen is also passed upwardly into catalyst bed (c). The catalyst beds of the reaction zones are maintained at a temperature of about 325° C. under atmospheric pressure. The reactant gases are intimately contacted with the catalyst in bed (c) wherein a major portion of the conversion of halogenated product takes place. The gaseous effluent then passes upwardly through a quench zone of fluidized montmorillonite clay, having a particle size of 200 mesh. The reaction and quench of the effluent is repeated in catalyst bed (b) and quench zone (d) and is finally treated in catalyst bed (a), for conversion of the remaining unconverted ethane. The gaseous effluent passes upwardly through grid 5 into the cooling zone wherein the temperature is maintained at 200° C. by indirect heat exchange of regenerated dessicant and gaseous effluent from catalyst bed (a) with water in cooling coil 26. In the cooling zone the gaseous effluent from the reaction zone is contacted with additional quantities of dried or regenerated montmorillonite 200 mesh desiccant in order to remove additional quantities of water condensed by the heat exchange operation. A dried gaseous effluent representing about 95 percent conversion and containing about 20 percent chloroethane and about 60 percent dichloroethane, is then withdrawn from the coling zone and the reaction vessel by means of line 28.

The desiccant material separated from the gaseous effluent in the cooling zone in a free space above the fluidized bed maintained therein is withdrawn from the cooling zone through standpipe 9 and passed successively through quench zones (d) and (e). The desiccant material, after having absorbed about 2 percent by weight of water in the quench zone is withdrawn from zone (e) by means of valved standpipe 10 and passed in a confined column to the stripping zone below the fluidized bed level maintained therein. In the stripping zone the "wet" desiccant material is contacted at a temperature of about 325° C. with oxygen gas passing upwardly in the zone. The oxygen serves to strip out any of the chlorine gas or chlorinated product which is produced in the reaction zone and which may be entrained in the withdrawn desiccant. The solid desiccant is disengaged from the upwardly flowing gaseous material in a space between the fluidized bed level of the stripping zone and grid 6 in the bottom of the reaction zone. The resulting gas mixture passing upwardly through grid 6 provides the oxygen necessary in the reaction zone. The flow rate of the desiccant material through the contactor is maintained at a rate of about 0.5 foot per second.

The stripped desiccant material is withdrawn from the stripping zone by means of valved standpipe 14, and passed to lift column 30 from which it is passed upwardly to the bottom of the drying zone by means of a fluidizing gas such as air heated to a temperature of about 575° C. The drying zone is maintained, by a heater not shown, or by the temperature of the fluidizing gas at a temperature of about 550° C. and the desiccant material is circulated therethrough in a fluidized state. Flue gases and water vapor are removed through vent line 12 while regenerated desiccant is passed downwardly in standpipe 8 from a lower portion of the drying zone into the cooling zone below the level of the fluidized bed therein.

In the course of the reaction, the cupric chloride catalyst is subsequently reduced to the cuprous form. When this occurs, the catalyst material is withdrawn through a valved catalyst withdrawal line for regeneration while fresh catalyst is introduced through valved catalyst feed line to compensate for the catalyst withdrawn. This operation can be regulated so that the catalyst from each bed is continuously withdrawn and replenished or the entire catalyst in a bed can remain in operation until a substantial portion is reduced by the reaction whereupon the entire portion of the spent catalyst is withdrawn and replenished with fresh catalyst.

This example was repeated using chromia in place of cupric chloride as the catalyst. A high yield of dichloroethane was obtained and the vapors from the reactor contained no aqueous hydrogen chloride.

It is to be understood that any of the carbon compounds described above can be substituted in the example to provide high yields of chlorinated product. However, when olefinic materials are employed, somewhat lower temperatures are generally found to be beneficial, for example reaction temperatures between about 250° C. and about 350° C. In the case of ethylene, a temperature of about 315° C. has been found to be advantageous. With aromatic compounds, such as, for example benzene, a reaction temperature within the range of between 275° C. and about 300° C. is generally employed for chlorination.

It is also to be understood that any of the halogenating agents mentioned above can be substituted in the example to produce the corresponding halogenated product in high yield. However, it is generally found that fluorination reactions require a somewhat higher reaction temperature than those mentioned in the example (between about 375° C. and 450° C.); whereas bromination can usually be carried out at somewhat lower reaction temperatures (most desirably in the order of between about 200° C. and about 300° C.).

As mentioned above air can be substituted for oxygen in the stripping zone, however, it is recommended that when air is employed the mole ratio of air to hydrocarbon should be about 5:1 instead of the ratio of oxygen to hydrocarbon which is generally about 1:1.

If desired, the lift gas passing through transfer line 30 can be replaced with steam or any other gas which is inert to the reaction. If desired, natural gas can also be employed.

Having thus described my invention I claim:

1. In a condensation reaction wherein a hydrocarbon is catalytically racted with halogen in the presence of oxygen, the improvement which comprises: treating the reaction mixture in the reaction zone with at least 10 parts by weight of desiccant solids based on oxygen and in an amount sufficient to dehydrate the vaporous reaction mixture in the reaction zone; said amount of desiccant being unadmixed with, and independent of, any material used as support for the catalyst.

2. The process of claim 1 wherein the desiccant is acid activated bentonite.

3. The process of claim 1 wherein the desiccant is an acid activated montmorillonite.

4. In a condensation reaction wherein a hydrocarbon is catalytically reacted in a reaction zone with halogen in the presence of oxygen, the improvement which comprises: alternately treating the reaction mixture with a solid halogenation catalyst at reaction temperature in a solid catalyst contacting zone and then with desiccant solids in a separate zone at a temperature below the temperature of the solid catalyst contacting zone; said desiccant being in an amount of at least 10 parts by weight based on oxygen and sufficient to dehydrate the vaporous reaction mixture in the reaction zone and said amount of desiccant being unadmixed with, and independent of, any material used as support for said catalyst; continuously removing the desiccant from the reaction zone before its water saturation limit is reached; and continuously replacing the withdrawn desiccant with dry desiccant at a temperature below the temperature in the reaction zone.

5. In a condensation reaction wherein a $C_1$ to $C_6$ hydrocarbon is catalytically reacted in a reaction zone with chlorine in the presence of oxygen and hydrogen chloride, the improvement which comprises: alternately treating the reaction mixture with solid halogenation catalyst at a temperature between about 300° F. and about 925° F. in a solid catalyst contacting zone and then with desiccant solids in a separate zone at a temperature below the temperature in the solid catalyst contacting zone, said desiccant being in an amount of at least 10 parts by weight based on oxygen and sufficient to dehydrate the reaction mixture in the reaction zone and said amount of desiccant being unadmixed with, and independent of, any catalyst and catalyst support; continuously removing the desiccant from the reaction zone before its saturation is reached; continuously drying the desiccant and recycling the dried desiccant to the reaction zone at a temperature below the temperature in the reaction zone.

6. Process of claim 5 wherein the desiccant is maintained in a moving bed of smaller particle size than the catalyst and the catalyst is maintained as a stationary bed.

7. The process of claim 5 wherein the catalyst is cupric chloride.

8. The process of claim 5 wherein the catalyst is chromium sesquioxide.

9. In a condensation reaction wherein a hydrogen halide is contacted with oxygen to produce water and halogen and halogen is reacted with a hydrocarbon to produce a halogenated product in the presence of a catalyst, the improvement which comprises: alternately contacting the reaction mixture containing as reactants oxygen, hydrogen halide, halogen and hydrocarbon, with a solid catalyst in a plurality of fixed catalyst beds and with a solid desiccant as a fluidized mass above the catalyst beds; introducing the desiccant into said fluidized beds in an amount at least 10 parts by weight of oxygen and in an amount of between 10:1 and about 200:1 weight ratio of desiccant to water, said amount of desiccant being independent of any material used as support for the catalyst; cooling the reaction mixture between catalyst beds by direct heat exchange with the fluidiezd desiccant and withdrawing anhydrous halogenated hydrocarbon from said reaction zone.

10. The process of claim 9 wherein the fluidized desiccant is of a smaller particle size than that of the catalyst and wherein at least a portion of the spent catalyst and desiccant are separately withdrawn, regenerated and recycled to their respective zones in the reaction zone to maintain the catalyst and desiccant in a high state of activity.

11. In a condensation reaction wherein a hydrocarbon is catalytically reacted in a reaction zone with halogen in the presence of oxygen the improvement which comprises: contacting the reaction mixture in the reaction zone first in a fixed halogenation catalyst bed of solid particles and then with at least 10 parts by weight of bentonite clay as a desiccant based on the oxygen and in an amount sufficient to dehydrate the reaction mixture, said desiccant being maintained in a moving bed and in smaller particle size than that of the catalyst and being physically unadmixed with the solid catalyst particles in the reaction zone and said amount of desiccant being independent of any material used as support for said catalyst; and withdrawing anhydrous halogenated hydrocarbon from the reaction zone.

12. In a condensation reaction wherein a hydrocarbon is catalytically reacted in a reaction zone with halogen in the presence of oxygen the improvement which comprises: alternately contacting the hydrocarbon with halogen in a plurality of fixed catalyst beds of solid particles and fluidized desiccant beds of solid particles; introducing desiccant into said fluidized beds in an amount of at least 10 parts by weight of desiccant based on oxygen and in an amount sufficient to dehydrate the reaction mixture, said amount of desiccant being independent of any material used as support for the catalyst and being introduced at a lower temperature than that of the catalyst beds; cooling the reaction mixture between each of the catalyst beds by direct heat exchange with the fluidized desiccant; and withdrawing anhydrous halogenated hydrocarbon from said reaction zone.

13. In a condensation reaction wherein hydrogen chloride is oxidized with oxygen to produce chlorine and water and the chlorine is catalytically reacted with a hydrocarbon to produce a chlorinated product in a reaction zone, the improvement which comprises: alternately contacting the reaction mixture in a plurality of fixed catalyst beds of solid particles each superimposed by a bed of fluidized solid desiccant which is unmixed with said catalyst; continuously adding to the upper portion of the reaction zone at least 10 parts by weight of the desiccant based on oxygen present in said reaction mixture; maintaining an anhydrous reaction mixture by sorbing water of reaction from the reaction mixture as soon as it is formed by contact with said desiccant; continuously passing desiccant from the upper portion of said reaction zone downwardly in series through the fluidized desiccant beds maintained over each of the fixed catalyst beds and by-passing the fixed catalyst beds; withdrawing desiccant containing sorbed water of reaction from the bottom portion of the reaction zone; continuously withdrawing spent solid catalyst from said fixed beds for regeneration and recycling regenerated catalyst to the fixed catalyst beds, said catalyst being maintained in discrete particles of a size larger than the particles of said desiccant; continuously regenerating said desiccant by drying and recycling the dried desiccant to the reaction zone at a rate sufficient to maintain said concentration in said reaction zone and at a temperature lower than the reaction temperature in the reaction zone; continuously cooling the chlorinated hydrocarbon product in the upper portion of said reaction zone with said desiccant introduced at a temperature lower than the reaction temperature and continuously withdrawing anhydrous chlorinated hydrocarbon from the reaction zone as the product of the process.

14. A continuous process for the production of an organic halogen-containing compound which comprises the steps in combination: in a reaction zone catalytically reacting a halogen with a halogenatable olefiic hydrocarbon to produce a reaction mixture wherein less than 50 percent of the desired halogenation conversion is effected; contacting the resulting reaction mixture with oxygen, hydrogen halide and at least 10 parts by weight of a solid desiccant based on oxygen said amount of desiccant being independent of any material used as support for the catalyst; converting an additional portion of the hydrocarbon to halogenated hydrocarbon and maintaining an anhydrous reaction mixture by absorbing water from the vapors as soon as it is formed in the reaction zone by said solid desiccant.

15. In a condensation reaction wherein a hydrocarbon is catalytically reacted with halogen in the presence of oxygen in a reaction zone the improvement which comprises: contacting and reacting a gaseous mixture of the hydrocarbon, halogen, hydrogen halide and oxygen in a dense, solid bed of halogenation catalyst to form water of reaction; passing the contacted and reacting gaseous mixture through a dispersed phase of solid fluidized desiccant above said catalyst bed and unadmixed with said catalyst; maintaining at least 10 parts by weight of desiccant based on oxygen in said dispersed phase said amount of desiccant being independent of any material used as support for the catalyst; maintaining an anhydrous reaction mixture by sorbing water from the vapors as soon as it is formed by contact with said desiccant; continuously withdrawing desiccant containing sorbed water from the reaction zone and drying said desiccant prior to its water saturation limit; recycling the dried desiccant to the reaction zone at a rate sufficient to maintain said concentration in said reaction zone; separately withdrawing catalyst prior to deactivation from said reaction zone and supplying fresh catalyst to said reaction zone.

16. The process of claim 15 wherein the vaporous reactants are contacted and reacted in a plurality of catalyst bed zones with interposed desiccant zones.

References Cited

UNITED STATES PATENTS

| | | | |
|---|---|---|---|
| 1,835,202 | 12/1931 | Ayres | 260—662 |
| 1,935,648 | 11/1933 | Mares | 260—650 |
| 1,970,562 | 8/1934 | Hanne | 260—653.7 |
| 2,007,144 | 7/1935 | Nutting | 260—658 |
| 2,110,369 | 3/1938 | Leicester | 260—653.7 |
| 2,436,225 | 2/1948 | Ogorzaly et al. | 23—288.35 |
| 2,439,582 | 4/1948 | Scheinenan | 23—288.35 |
| 2,488,560 | 11/1949 | Reitlinger | 260—659 |
| 2,852,571 | 9/1958 | Frejacques et al. | 260—650 |
| 2,866,830 | 12/1958 | Dunn et al. | 260—650 |
| 3,012,080 | 12/1961 | Bergeron | 260—658 |
| 3,159,455 | 12/1964 | Skaperdas et al. | |
| 3,276,842 | 10/1966 | Pfeiffer et al. | 260—648 X |

LEON ZITVER, *Primary Examiner.*

ALPHONSO D. SULLIVAN, *Examiner.*

S. H. BLECH, K. H. JOHNSON, K. V. ROCKEY,
H. MARS, *Assistant Examiners.*